(12) United States Patent
Hug

(10) Patent No.: US 8,775,314 B2
(45) Date of Patent: Jul. 8, 2014

(54) PROVIDING SUBSCRIBED MEDIA CONTENT TO PORTABLE MEDIA PLAYER DEVICES ASSOCIATED WITH SUBSCRIBERS

(75) Inventor: Joshua D. Hug, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 1289 days.

(21) Appl. No.: 11/618,726

(22) Filed: Dec. 29, 2006

(65) Prior Publication Data
US 2008/0046262 A1 Feb. 21, 2008

Related U.S. Application Data

(60) Provisional application No. 60/754,840, filed on Dec. 29, 2005.

(51) Int. Cl.
*G06F 21/00* (2013.01)
(52) U.S. Cl.
USPC .............. 705/51; 705/50; 705/54; 705/57; 380/227; 380/228; 380/229; 380/230; 380/201; 380/202; 380/203; 380/204

(58) Field of Classification Search
CPC .................................... G06F 21/00
USPC ............................................ 705/51
See application file for complete search history.

(56) References Cited

U.S. PATENT DOCUMENTS

| | | | |
|---|---|---|---|
| 5,918,223 A * | 6/1999 | Blum et al. ................. | 1/1 |
| 6,112,181 A | 8/2000 | Shear et al. | |
| 6,732,106 B2 * | 5/2004 | Okamoto et al. ............. | 707/784 |
| 6,947,910 B2 | 9/2005 | Hsu et al. | |
| 7,114,167 B2 * | 9/2006 | Slemmer et al. ............... | 725/28 |
| 7,426,637 B2 * | 9/2008 | Risan et al. .................... | 713/165 |
| 7,502,344 B2 * | 3/2009 | Matsumoto ................... | 370/328 |
| 7,509,496 B2 * | 3/2009 | Skog et al. .................... | 713/170 |
| 7,734,248 B2 * | 6/2010 | Matsumoto .................. | 455/3.06 |
| 8,069,255 B2 * | 11/2011 | Grannan ....................... | 709/229 |
| 8,108,484 B2 * | 1/2012 | Rhoads et al. ................ | 709/217 |
| 8,151,063 B2 * | 4/2012 | Morita ........................ | 711/154 |
| 2002/0002674 A1 | 1/2002 | Grimes et al. | |
| 2002/0013772 A1 * | 1/2002 | Peinado ......................... | 705/51 |
| 2002/0049679 A1 * | 4/2002 | Russell et al. ................ | 705/52 |
| 2002/0157002 A1 * | 10/2002 | Messerges et al. ............ | 713/155 |
| 2003/0014496 A1 | 1/2003 | Spencer et al. | |

(Continued)

FOREIGN PATENT DOCUMENTS

WO   WO 2009007779 A2 *   1/2009   ............. G06Q 30/00

OTHER PUBLICATIONS

Getting Started Microsoft Windows 98. Microsoft Corporation, Redmond, WA, 1999. Entire manual included.*

(Continued)

*Primary Examiner* — James A Reagan
(74) *Attorney, Agent, or Firm* — Adam L. K. Philipp; ÆON Law

(57) ABSTRACT

Methods and apparatus for providing media content offered by media content subscription service to portable media player devices associated with subscribers of the service are described herein. In various embodiments, particular fulfillment module, request module and media player are provided to fulfillment server(s) of the subscription service, request client devices, and portable media player devices, respectively.

12 Claims, 5 Drawing Sheets

(56) References Cited

U.S. PATENT DOCUMENTS

| | | | |
|---|---|---|---|
| 2003/0078853 A1 | 4/2003 | Peinado et al. | |
| 2003/0126086 A1* | 7/2003 | Safadi | 705/51 |
| 2003/0131226 A1 | 7/2003 | Spencer et al. | |
| 2005/0216743 A1* | 9/2005 | Peinado | 713/176 |
| 2006/0150257 A1* | 7/2006 | Leung et al. | 726/27 |
| 2006/0159109 A1* | 7/2006 | Lamkin et al. | 370/401 |
| 2006/0161635 A1* | 7/2006 | Lamkin et al. | 709/217 |
| 2006/0190410 A1* | 8/2006 | Harper | 705/59 |
| 2006/0190413 A1* | 8/2006 | Harper | 705/65 |
| 2007/0027814 A1* | 2/2007 | Tuoriniemi | 705/59 |
| 2007/0033419 A1* | 2/2007 | Kocher et al. | 713/193 |

OTHER PUBLICATIONS

How Networks Work, Millennium Edition. Derfler, Frank and Les Freed. QUE Publishing, Indianapolis, 2000. ISBN 0-7897-2445-6. Entire book included.*

How Computers Work, Millennium Edition. White, Ron. QUE Publishing, Indianapolis, 1999. ISBN 0-7897-2112-0. Chapters 1-9, 14-31 included.*

How Networks Work, Millennium Edition. Derfler, Frank and Les Freed. Que Publishing, 2000 ISBN 0-7897-2445-6. Front and back matter, chapters 1-27 provided.*

Internet Archive Wayback Machine, archive of "FindMeATune. com / Search Lyrics to Find That Song Name!" Archived on Mar. 16, 2005. Available at <http://replay.waybackmachine.org/20050316092357/http://www.findmeatune.com/>.*

Internet Archive Wayback Machine, archive of "search for song lyrics @ LyricServer.com." Archived on Feb. 6, 2003. Available at <http://replay.waybackmachine.org/20030206214720/http://www.lyricserver.com/>.*

Internet Archive Wayback Machine, archive of "Introduction to MusicBrainz." Archived on Feb. 8, 2003. Available at <http://replay.waybackmachine.org/20030208020504/http://musicbrainz.org/introduction.html>.*

* cited by examiner

PROVIDING SUBSCRIBED MEDIA CONTENT TO PORTABLE MEDIA PLAYER DEVICES ASSOCIATED WITH SUBSCRIBERS

CROSS-REFERENCE TO RELATED APPLICATIONS

This application is based upon and claims the benefit of priority from U.S. Provisional Patent Application No. 60/754,840, filed Dec. 29, 2005, the entire contents of which are incorporated herein by reference.

TECHNICAL FIELD

Embodiments of the present invention relate to the field of media content provision, in particular, to portable media player devices associated with subscribers of a media content subscription service.

BACKGROUND

Advances in microprocessor and related technologies have led to wide spread deployment and adoption of powerful general purpose as well as special purpose computing devices. Today, most of these computing devices are multi-media, i.e. video, audio and graphics enabled. Special purpose computing devices include but are not limited to digital camcorders, set-top boxes, and digital versatile disk (DVD) players.

Advances in networking, telecommunication, satellite, content serving and other related technologies have also led to increase in online multi-media content provision, including online purchases, as well as on demand and/or real time delivery of video/or audio content, over private and/or public networks, such as the Internet.

Recently, continuing advances in these technologies have further led to proliferation of portable devices, such as personal digital assistants, wireless mobile phones, portable media player devices, and so forth, as well as media content provision services catered towards selling media content for download onto these portable devices. An example of portable media player devices and associated media content purchase services is the ipod and the associated iTune service available from Apple Computer of Cupertino.

One drawback of the current state of portable media player devices and associated media content purchase services is the fact that the digital rights of the media content are not protected. For example, in the case of iPod, the audio content is provided in MP3 format, which may be rendered by any device equipped with a MP3 player. The media contents are freely transferable from one media player device to another. Further, the download is typically effectuated through specific uniform resource locators (URL) that directly identify the corresponding media content files (in MP3 format) and the locations the files are stored and may be retrieved. For the general media consuming population, it remains not the most user friendly approach.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include but are not limited to methods and apparatuses for providing media content offered by a media content subscription service to portable media player devices associated with subscribers of the media content subscription service that are user friendly, even for the novice users.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
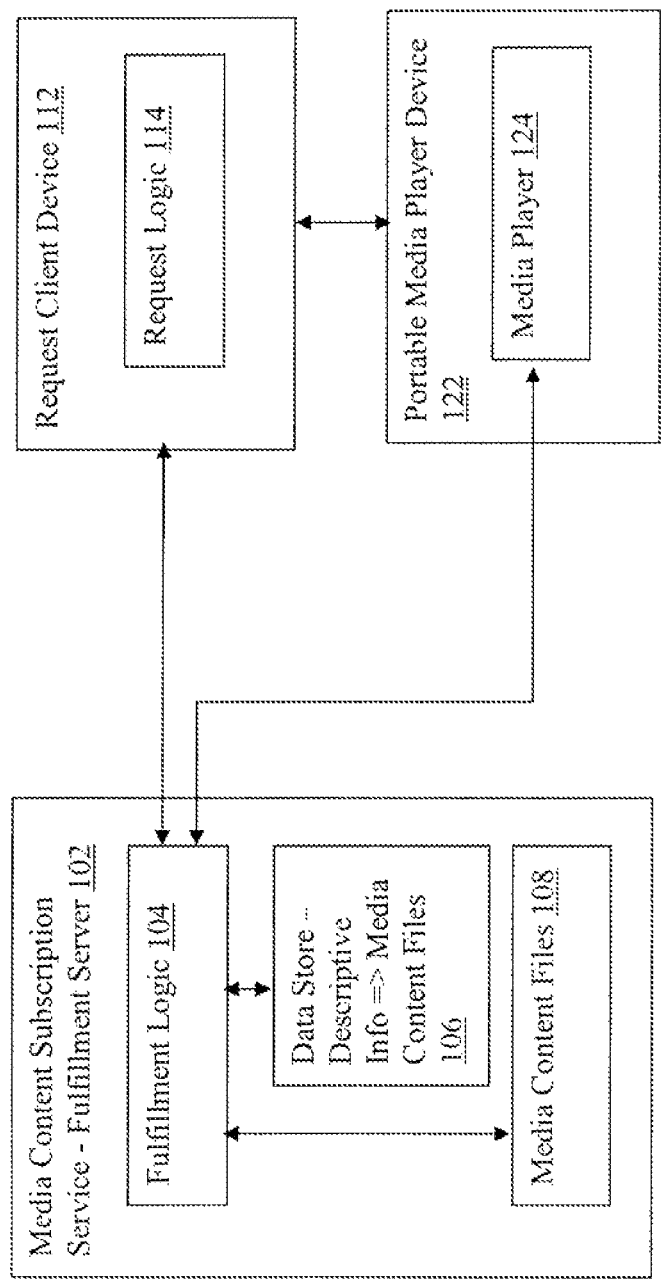
FIG. 1 illustrates an overview of the invention, in accordance with various embodiments.

FIG. 1 illustrates an overview of the present invention, in accordance with various embodiments. As illustrated, for the embodiments, a media content subscription service is provided with a fulfillment server 102 equipped with fulfillment module or logic 104 to provide media content files 108 containing media contents offered by the media content subscription service to portable media player devices (e.g. 122) associated with subscribers of the service. The media contents may be audio, video, and/or graphics. The media contents may be digital or analog. The media contents may be encoded or not encoded. The media contents may be compressed or not compressed. Thus, the term "media content" as used herein, unless explicitly particularized, includes each one of these and other variations in substance and in form.

In various embodiments, portable media player device 122 may be provided with media content files from fulfillment server 102 at the initiation of request (or "requesting") client device 112. In various embodiments, portable media player device 122 may be provided with media content files offered by the media content subscription service, through request client device 112 or directly from fulfillment server 102.

The term "media content subscription service" as used herein refers to a service which in consideration of a user's payment of a subscription fee (e.g. lifetime membership) or continuing payments of periodic subscription fees (e.g. monthly), offers the user its collection of media content for the user's enjoyment. The "user" may be referred to as a subscriber of the subscription service. The offered service maybe for a subset of the collection, e.g. if there are different categories of subscribers with different levels of subscription fees; however, the quid pro quo between the user and the service is not at a title or album level. An example of such subscription service is the Rhapsody subscription service offered by RealNetworks, Inc., assignee of the present invention.

Further, the media contents offered by a media content subscription service for their subscribers' consumption are typically characterized by, though not necessarily required for all offered media contents, integral digital rights management with the media contents. In various embodiments, the integral digital rights management may include identifiers or keys associated with the subscribers, devices associated with the subscribers, e.g. request client devices 112 and/or portable media player devices 122, and/or the media content themselves.

Still referring to FIG. 1, in various embodiments, request client device 112 may be coupled to fulfillment server 102 via a wide area network (WAN) connection spanning one or more public and/or private networks, e.g. the Internet. Portable media player device 122 maybe coupled to request client device 112 via a local area network (LAN), or over a parallel or serial bus. Examples of serial bus include but are not limited to a Universal Serial Bus (USB) or an IEEE 1394 bus (IEEE=Institute of Electrical and Electronic Engineers). In various embodiments, portable media player device 122 may be coupled to fulfillment server 102 via a wireless service network.

In various embodiments, in addition to fulfillment module or logic 104, fulfillment server 102 may include data store 106 and media content files 108 operatively coupled to fulfillment module or logic 104 as shown. Media content files 108 correspondingly contain media content offered by the media content subscription service. The media content may be encoded and/or compressed in accordance with any one of a number of encoding techniques. Data store 106 includes data for identifying the media content files 108 with media content described by media content descriptive information. In various embodiments, the data include the storage locations of the media content files. The data may be organized and stored in accordance with any one of a number of data organization techniques. The data of data store 106 maybe initially loaded into fulfillment server 102 and periodically or continually updated thereafter. In alternate embodiments, media content files 108 maybe stored in remote storage locations.

In various embodiments, fulfillment module or logic 104 is adapted to receive media content requests from request client device 114, transmitted on behalf of the associated service subscribers. In various embodiments, the media content requests include the media content description information describing the media content requested. Fulfillment module or logic 104 accesses the data stored in data store 106 to identify the media content files for use to satisfy the requests.

The term media content descriptive information as used herein refers to information that describes the media content being requested, but not directly identifying the media content file or files and/or their storage locations, such as a uniform resource locator (IJRL) of a media content file. Media content descriptive information may include a title of a media content, an artist associated with a media content, a genre of the media content, a name of a community, and so forth. An example of a community may be Top 100.

In various embodiments, a media content request may further include identification information identifying the requesting subscriber, the requesting client device 112 and/or the associated portable media player device 122. In various embodiments, a media content request may further include identification of whether the request client device 112 or the associated media player device 122 is to be the device receiving the media content file containing the requested media content from fulfillment server 102 for the request.

In various embodiments, the subscriber identifier may also be used as descriptive information describing the media content requested. For example, in the context of such usage, the subscriber identifier may facilitate identification of the media content recently consumed/enjoyed by the subscriber, the media content identified in the subscriber's playlist, and so forth.

In various embodiments, request client device 114 includes request module or logic 116 adapted to facilitate a subscriber in making a media content request for an associated portable media player device 122. In various embodiments, request module or logic 116 is additionally adapted to receive the media content files from fulfillment server 102, and provide the received media content files to the associated portable media player devices 122.

In various embodiments, portable media player device 122 includes media player 114 adapted to render media content. In various embodiments, media player 114 is adapted with the ability to render media content encoded and/or compressed in a variety of encoding and/or compression formats. In various embodiments, media player 114 is further adapted to receive media content files from either request client device 112, or directly from fulfillment server 102, or both.

Accordingly, depending on the embodiments, that is, whether request client device 112 or portable media player device 122 is to receiving the media content file from fulfillment server 102, either may be referred to as a receiving (client) device. In various embodiments, request client device 112 is the receiving client device when it has a larger bandwidth connection to fulfillment server 102, and large volume of media content files are to be transferred, whereas portable media player device 122 is the receiving client device when a relative small volume of media content files are to be transferred, and portable media player device 122 has a connection with reasonably sufficient bandwidth to facilitate the transfer.

While for ease of understanding, only one each of fulfillment server 102, request client device 112 and portable media player device 122 is illustrated in FIG. 1, the invention is not so limited. Embodiments of the invention may be practiced with one or more fulfillment servers 102, one or more request client devices 112 and one or more portable media player devices 122.

In various embodiments, each of fulfillment module or logic 104, request module or logic 114 and media player 124 may be implemented in hardware or software. Hardware embodiments may be implemented via Application Specific Integrated Circuits (ASIC) or reconfigurable circuits (such as Field Programmable Gate Arrays (FPGA). Software embodiments may be implemented using any one or combinations of a number of programming languages.

In various embodiments, native fulfillment server(s) 102 (without fulfillment module or logic 104, data store 106 and media content files 108) may be one or more servers offered by IBM of Armonk, N.Y., or Sun Microsystems of Mountain View, Calif., and so forth. Native request client device(s) 112 (without request module or logic 114) may be one or more desktop computers available from Hewlett Packard of Palo Alto, Calif., or from Gateway Computer of Sioux Falls, S.D. Native portable media player device(s) 122 (without media player 124 having been enhanced with the teachings of the present invention) may be one or more portable media player device(s) from Dell Computer of Austin, Tex., or from Apple Computer of Cupertino, Calif.

Figure 2:
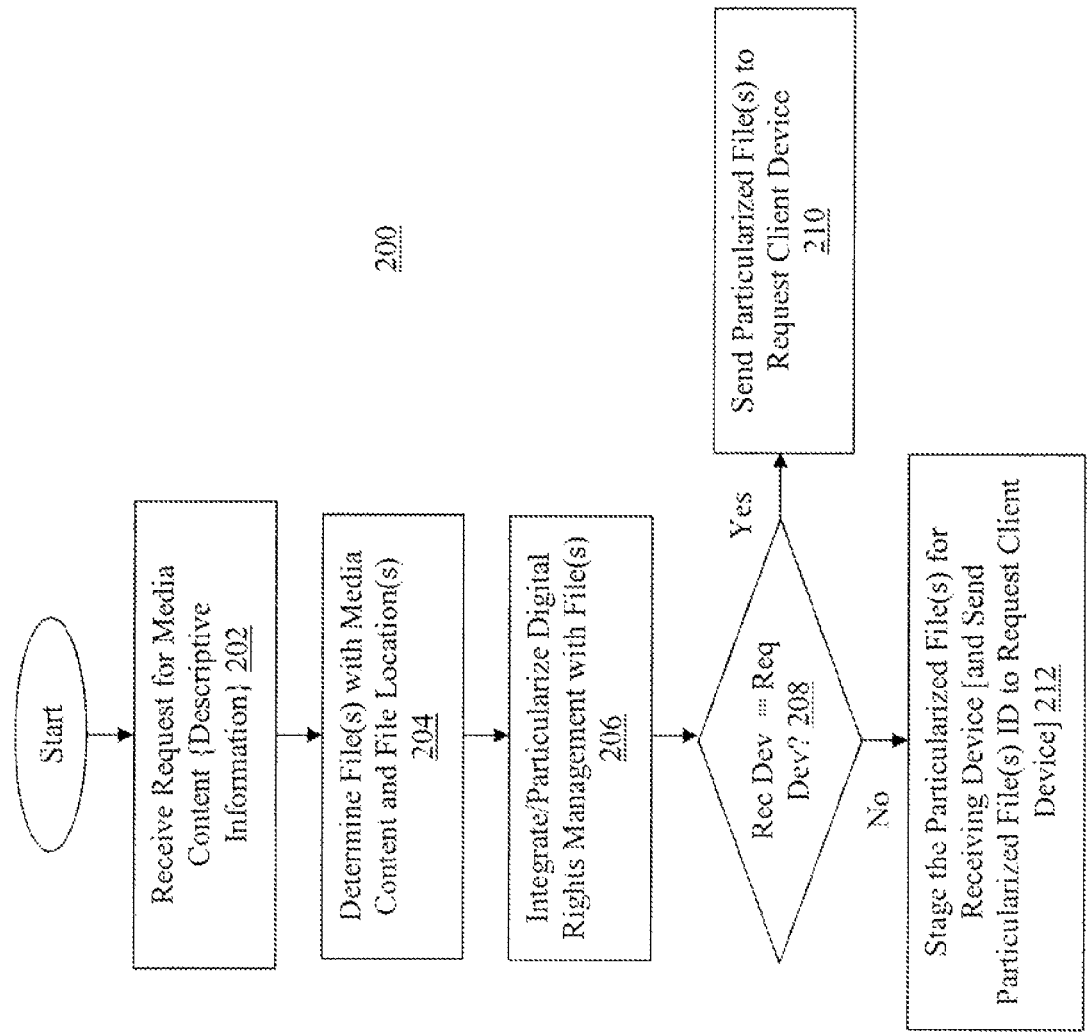
FIG. 2 illustrates a flow chart view of selected operations of a fulfillment server of the media content subscription service of FIG. 1 in accordance with various embodiments.

Referring now to FIG. 2, wherein a flow chart view of selected operations of fulfillment module or logic 104 is illustrated, in accordance with various embodiments of the invention. As described earlier, in various embodiments, fulfillment module or logic 104 is adapted to receive 202 media content requests from request client devices 112, which transmit the media requests on behalf of the corresponding associated subscribers. In various embodiments, each media content request includes media content descriptive information describing the media content being requested, and/or identification information identifying the subscriber, the request client device 112, and/or the portable media player device 122.

In response, fulfillment module or logic 104 determines 204 one or more media content files (including their storage locations) for use to satisfy the request. In various embodiments, fulfillment module or logic 104 accesses data store 106 and uses the data stored therein to determine the media content file(s) for use to satisfy the request, and the media content files' storage locations.

On determination, for the embodiments, fulfillment module or logic 104 retrieves a copy of each of the relevant media content files, and particularizes 206 applicable one or ones of retrieved copy or copies for the subscriber, integrating particularized digital rights management data and/or logic with the applicable one or ones of retrieved copy or copies. In various embodiments, copies that do not require particularizing may be media contents not protected by copyrights. In various embodiments, the invention may be practiced with the media content subscription service offering no media content that are not subject to digital rights management. For these embodiments, all retrieved copies would be processed for integration of digital rights management data and/or logic.

In still other embodiments, digital rights management may be performed at a level not particularized to a subscriber and/or devices associated with the subscriber. For these embodiments, integration of digital rights management, or portions thereof, may be performed prior to fulfilling the various requests.

In various embodiments, besides common digital rights management data and/or logic (i.e. identical digital rights management data and/or logic for all subscribers and/or requests), the particularized digital rights management data may include access keys that are generated based at least in part on identifiers of the subscriber, the request client device, and/or the portable media player device. The access keys are typically complementary to the digital rights management technique employed, which may be any one of a variety of techniques.

Next, for the embodiments, fulfillment module or logic 104 determines 208 whether the request client device 112 or an associated portable media player device 122 is to be the receiving (client) device. For the embodiments, if the request client device 112 is to be the receiving (client) device, fulfillment module or logic 104 transmits 210 the particularized media content file to the request client device 112.

However, if the portable media player device 122 is to be the receiving (client) device, fulfillment module or logic 104 stages 212 the particularized media content file for the portable media player device 122 to download (e.g. at a later point in time). In various embodiments, at 212, fulfillment module or logic 104 may further transmit one or more identifiers identifying the particularized media content file(s) to request client device 112 to forward to portable media player device 122 for use to subsequently download the particularized media content file(s).

Figure 3:
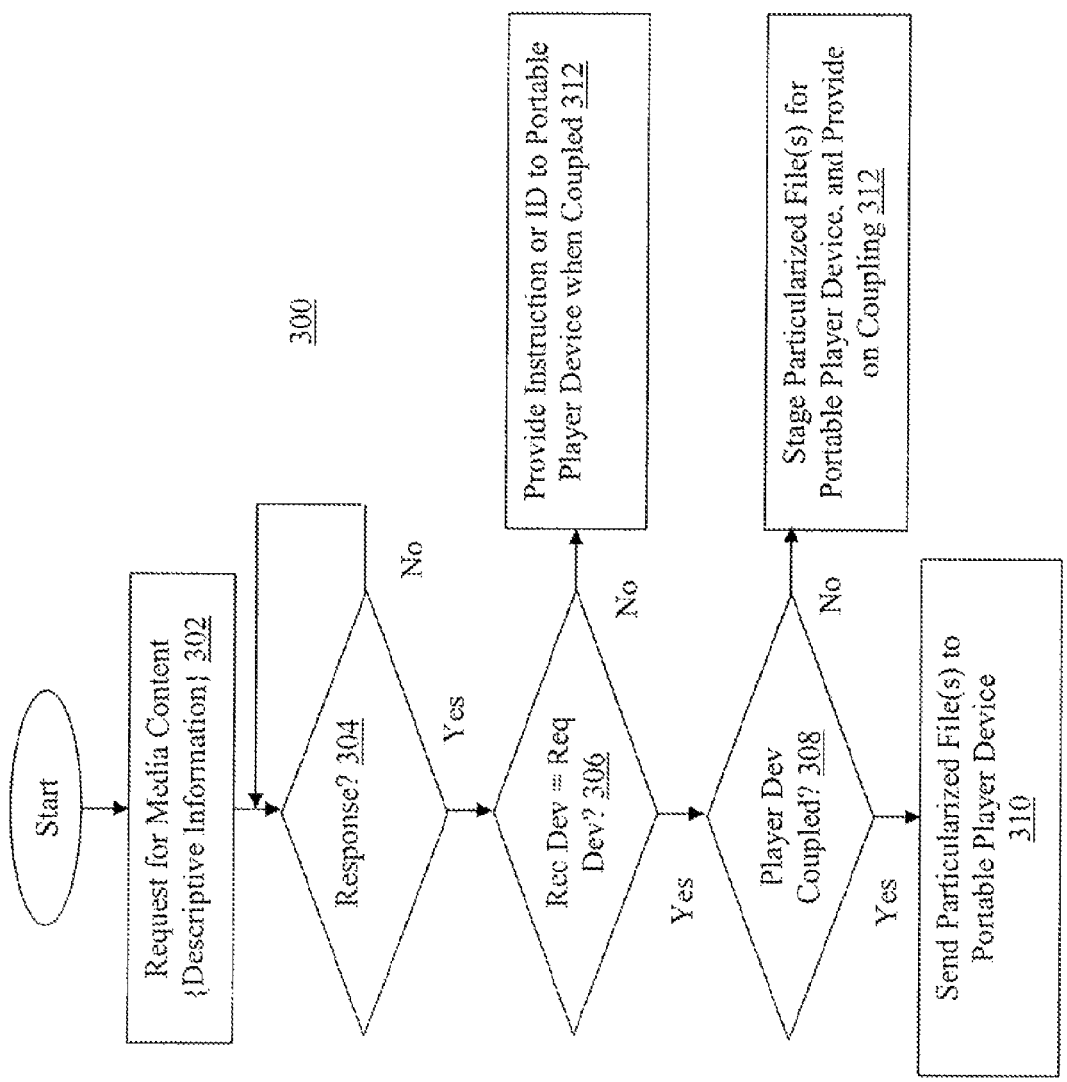
FIG. 3 illustrates a flow chart view of selected operations of the request client device of FIG. 1 in accordance with various embodiments.

FIG. 3 illustrates a flow chart view of selected operations of request module or logic 114, in accordance with various embodiments. As illustrated, for the embodiments, the selected operations start with request module or logic 114 transmitting 302 a request for media content offered by media content subscription service to fulfillment server 102 on behalf of a subscriber of the service. As described earlier, the request contains descriptive information describing the media content of interest, and, optionally, other information. Thereafter, request module or logic 114 waits 304 for the response to the request from fulfillment server 102.

On receipt of the response, for the embodiment, request module or logic 104 determines 306 whether it is the receiving device for the requested media content. If it is not the receiving device for the media content, for some embodiments where certain instructions and/or data, such as identification of the staged media files, are to be provided to the portable media device 122 to enable the portable media device 122 to directly download and receive the requested media content, request module or logic 104 may further determine 308 whether the media portable device 122 is currently coupled with the request client device 112. And on determining the media portable device 122 is currently coupled with the request client device 112, it forwards 308 the instructions and/or data to the media portable device 122.

In alternate embodiments, e.g. embodiments where portable media player 122 may request download of the staged media content file simply by identifying either itself, the request client device 112 or the subscriber, the instructions and/or data may simply contain an indication that the media content file(s) are ready for download. In still other embodiments, the instructions and/or data may simply contain an indication that the request has been made, with the indication being provided right after or shortly after the request has been made. Portable media player 122 may then check periodically with fulfillment server 102 for the readiness of the media content files.

Still referring to FIG. 3, at 306, if it is determined that request client device 112 is the receiving device, for the embodiments, request client device 112 further determines 308 whether portable media player 122 is currently coupled. For the embodiments, if the portable media player 122 is currently coupled, request client device 112 provides the received media content file(s) to portable media player device 122. In some of the embodiments, request client device 112 provides 310 the received media content file(s) to portable media player device 122 as they are received. If the portable media player 122 is not currently coupled, for the embodiments, request client device 112 stages 312 the received media content file(s) and provides 312 the staged media content file(s) to portable media player device 122 on its coupling.

Figure 4:
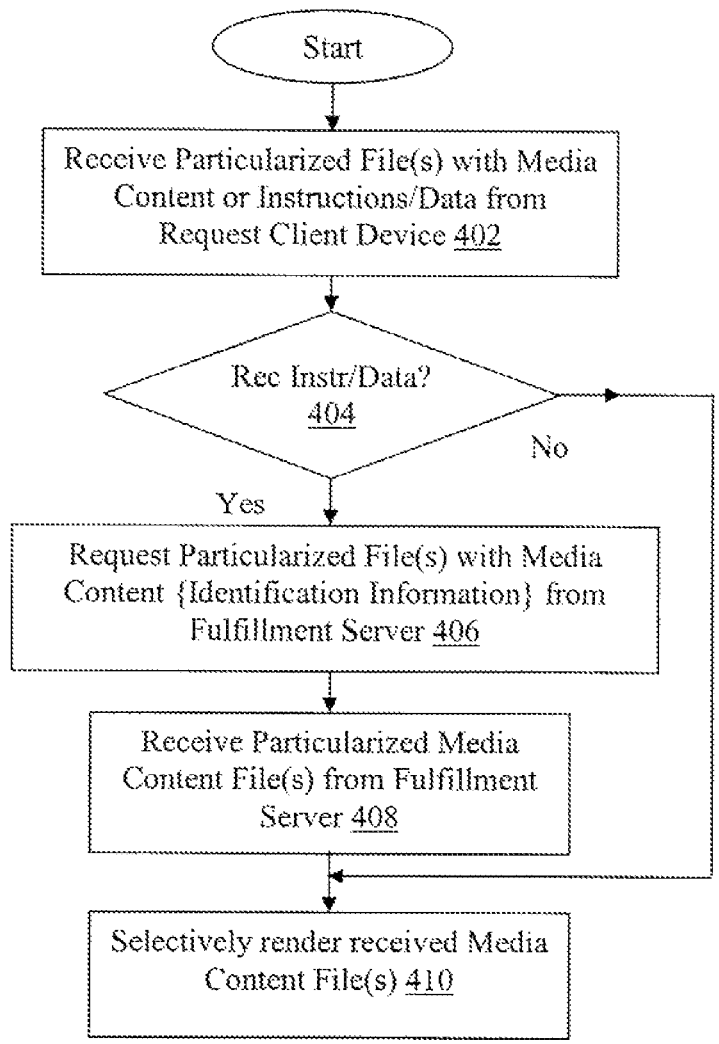
FIG. 4 illustrates a flow chart view of selected operations of the portable media player device of FIG. 1 in accordance with various embodiments.

FIG. 4 illustrates a flow chart view of selected operations of media player 124, in accordance with various embodiments. As illustrated, for the embodiments, the selected operations start with media player 124 receiving 402 from request client device 112 either media content files or instructions and/or data to obtain media content files from fulfillment server 102 directly. At 404, media player 124 determines whether it received media content files or merely instructions and/or data to receive such files.

For the embodiments, if instructions and/or data for obtaining media content files are received, media player 124 may further request 406 the media content file(s) from fulfillment server 102, and eventually, receive 408 the media content file(s) from fulfillment server 102.

Either case, on receipt of the media content file(s), media player 124 may selectively render the received media content files, at e.g. the direction of the subscriber.

Figure 5:
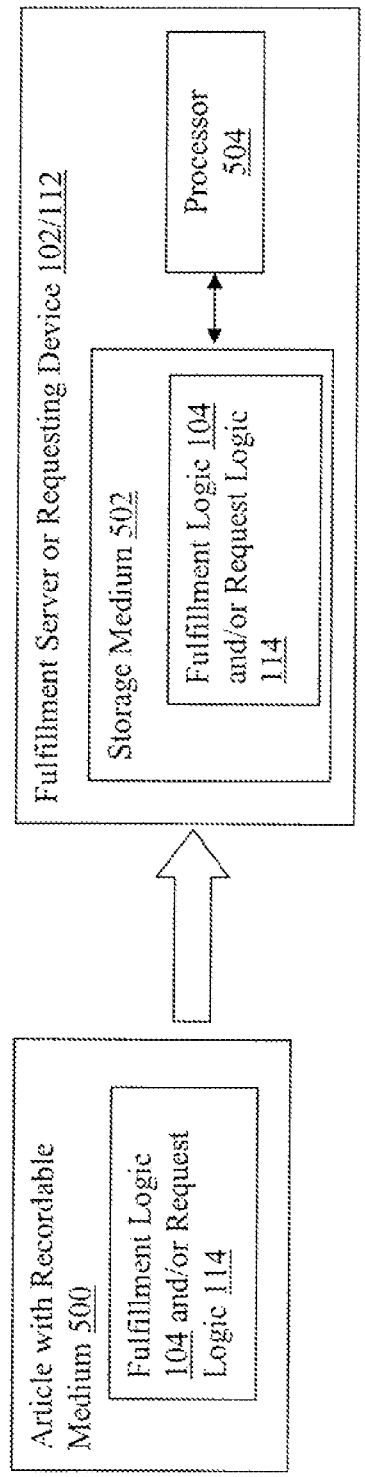
FIG. 5 illustrates an example computer readable medium, suitable for use to facilitate practice of the present invention, in accordance with various embodiments.

FIG. 5 illustrates an article of manufacture including a recordable medium 500 readable by a computing device, in accordance with various embodiments. Recordable medium 500 has stored therein programming instructions implementing a software embodiment of the earlier described fulfillment module or logic 104, request module or logic 114 and/or media player 124.

For these embodiments, fulfillment server 102, request client device 112 or portable media player 122 includes storage medium 502 to store at least a portion of a working copying of the programming instructions implementing the software embodiment of fulfillment module or logic 104, request module or logic 114 and/or media player 124, and at least one processor 504 coupled to storage medium 502 to execute the programming instructions.

Article 500 may e.g. be a diskette, a compact disk (CD), a DVD or other computer readable medium of the like. In other embodiments, article 500 may be a distribution server distributing fulfillment module or logic 104, request module or logic 114 and/or media player 124, to fulfillment module or logic 104, request module or logic 114 and/or media player 124, respectively, via private and/or public networks, such as the Internet. In one embodiment, article 500 is a web server.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A method comprising:
receiving a request for media content by a fulfillment server of a media content subscription service from a computing device in communication with a subscriber of the media content subscription service, the media content request comprising a subscriber identifier used as media content descriptive information describing the media content requested by the computing device for a portable media player device coupled with the computing device, wherein the media descriptive information does not include a uniform resource locator of the requested media content;
with the fulfillment server, accessing a data store and identifying one or more files and the files' stored location or locations based at least in part on the subscriber identifier used as media content descriptive information contained in the received request, and retrieving a copy or copies of the identified file or files;
associating the retrieved copy or copies of the one or more identified files with a digital rights management data or logic, or both, used by the media content subscription service to protect the media content from unauthorized use;
with the fulfillment server, selecting the computing device or the portable media player device as a receiving device; and
feeding the retrieved copy or copies to the receiving device after the retrieved copy or copies have been associated with the digital rights management data or logic, or both.

2. The method of claim 1 wherein selecting said receiving device is based at least on the size of the one or more identified files.

3. The method of claim 2 wherein selecting said receiving device is further based on a bandwidth of a connection from the computing device to the fulfillment server.

4. The method of claim 2 wherein selecting said receiving device is further based on a bandwidth of a connection from the portable player device to the fulfillment server.

5. An apparatus comprising:
a data store having data that facilitates identification of files of media content and the files' stored locations, based at least in part on a subscriber identifier used as media content descriptive information, the media content being media content offered by a media content subscription service to the service's subscribers, and copies of the files being used by the media content subscription service to fulfill subscriber media content requests for portable media player devices associated with the subscribers, after the copies have been associated with digital rights management data or logic, or both, used by the media content subscription service to protect the media content from unauthorized use; and
a fulfillment module coupled to the data store, and adapted to access the data store to determine one or more files and the files' stored location, based at least in part on the subscriber identifier used as media content descriptive information contained in a media content request received from a subscriber of the media content subscription service, the media content descriptive information of the media content request describing requested media content, wherein the media descriptive information does not include a uniform resource locator of the requested media content.

6. The apparatus of claim 5, wherein the fulfillment module is further adapted to select a receiving device for said one or more files based at least on the size of the one or more files.

7. A client-computing-device-implemented method comprising:
transmitting, by the client computing device, a media content request to a fulfillment server of a media content subscription service, the transmitting being performed on behalf of a subscriber of the media content subscription service, and the media content request including a subscriber identifier used as media content descriptive information describing a media content requested by the subscriber for a portable media player device associated with the subscriber, wherein the media descriptive information does not include a uniform resource locator of the requested media content;
receiving, by the client computing device from the fulfillment server, one or more copies of one or more files, or one or more identifiers of the one or more copies, the copy or copies having the requested media content and integral digital rights management data or logic, or both, used by the media content subscription service to protect the media content from unauthorized use, the fulfillment server determining the file or files as having the requested media content based at least in part on the subscriber identifier used as media content descriptive information contained in the media content request.

8. An apparatus comprising:

a processor; and a media content request module adapted to be operated by the processor to transmit a media content request to a fulfillment server of a media content subscription service, the transmitting being performed on behalf of a subscriber of the media content subscription service, and the media content request including a subscriber identifier used as media content descriptive information describing a media content requested by the subscriber for a portable media player device associated with the subscriber, wherein the media descriptive information does not include a uniform resource locator of the requested media content;

the media content request module further adapted to be operated by the processor to receive one or more copies of one or more files, or one or more identifiers of the one or more copies from the fulfillment server, the copy or copies having the requested media content and integral digital rights management data or logic, or both, used by the media content subscription service to protect the media content from unauthorized use, the fulfillment server determining the file or files as having the requested media content based at least in part on the subscriber identifier used as media content descriptive information contained in the media content request.

9. A computer-implemented method comprising:

transmitting, by a client device, a download request from a portable media player device to a fulfillment server of a media content subscription service, the download request requesting media content file or files staged for the portable media device, the media content file or files having been staged in response to a media content request submitted on behalf of a subscriber of the media content subscription service, the portable media player device being associated with the subscriber of the service, the download request including one or more identifiers identifying at least one selected from the group consisting of the portable media player, a subscriber associated with the portable media player, and the requesting client device that had submitted the media content request, at least one of the files having media content and integral digital rights management data or logic, or both, used by the media content subscription service to protect the media content from unauthorized use, the media content request comprising the subscriber identifier used as media content descriptive information describing the requested media content, wherein the media content request does not include a uniform resource locator of the requested media content; and receiving, by the client device, one or more media content files from the fulfillment server.

10. A portable media player device comprising:

a processor; and a media player adapted to be operated by the processor to transmit a download request to a fulfillment server of a media content subscription service, the download request requesting media content file or files staged for the portable media device, the media content file or files having been staged in response to a media content request submitted on behalf of a subscriber of the media content subscription service, the portable media player device being associated with the subscriber, the download request including one or more identifiers identifying at least one selected from the group consisting of the portable media device, a subscriber associated with the portable media device, and a requesting client device that had submitted the media content request, at least one of the staged files having media content and integral digital rights management data or logic, or both, used by the media content subscription service to protect the media content from unauthorized use, and the media player being further adapted to receive the file or files from the fulfillment server, the media content request comprising the subscriber identifier used as media content descriptive information describing the requested media content, wherein the media content request does not include a uniform resource locator of the requested media content.

11. A non-transient computer readable storage medium having stored thereon a plurality of programming instructions, the programming instructions having been adapted to program an apparatus to configure the apparatus to perform the method as set forth in claim 1.

12. A non-transient computer readable storage medium having stored thereon a plurality of programming instructions, the programming instructions having been adapted to program an apparatus to configure the apparatus to perform the method as set forth in claim 7.

* * * * *